Nov. 21, 1961 W. RESK 3,009,658
VEGETABLE-PEELING APPLIANCE FOR REMOVABLE APPLICATION TO A SINK
Filed March 10, 1958 3 Sheets-Sheet 1
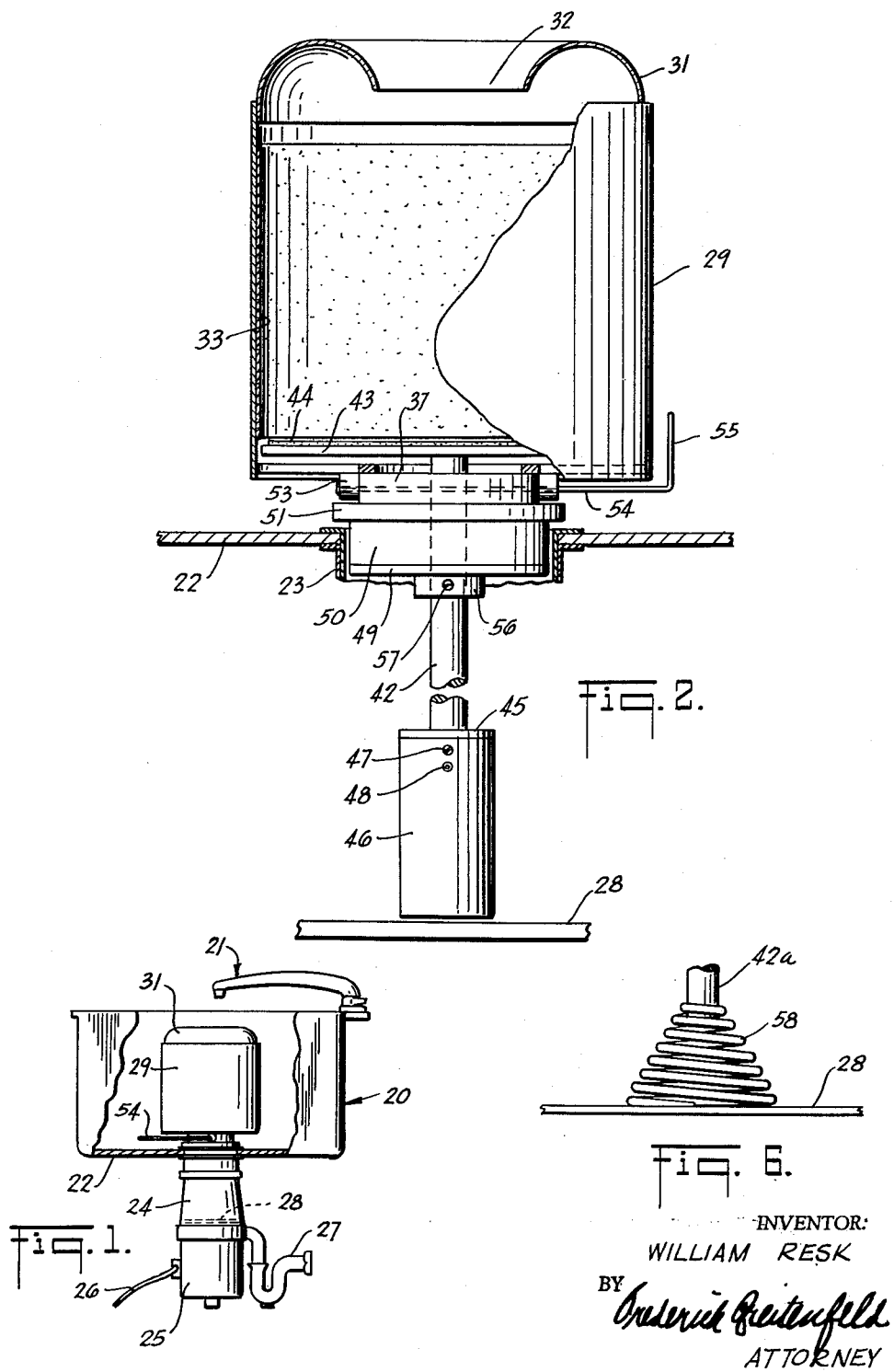
INVENTOR:
WILLIAM RESK
BY Frederick Breitenfeld
ATTORNEY Nov. 21, 1961   W. RESK   3,009,658
VEGETABLE-PEELING APPLIANCE FOR REMOVABLE APPLICATION TO A SINK
Filed March 10, 1958   3 Sheets-Sheet 2
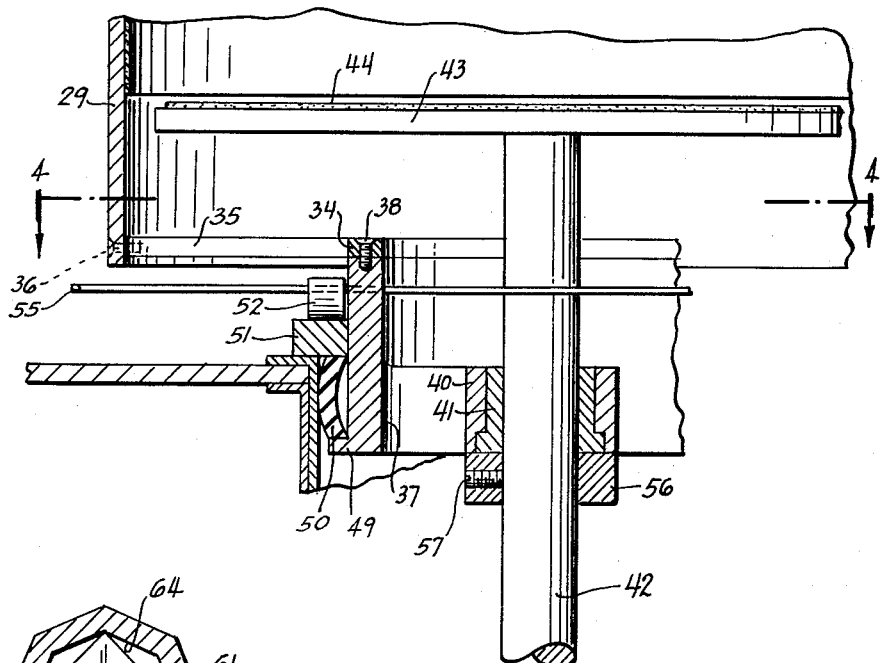
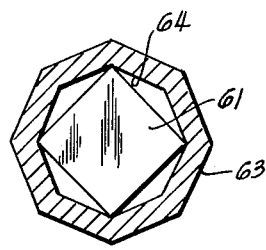
fig.8.
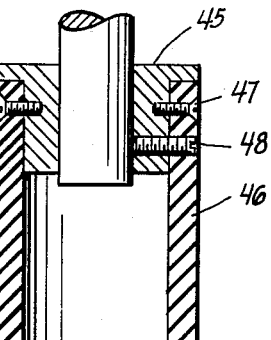
fig.3.
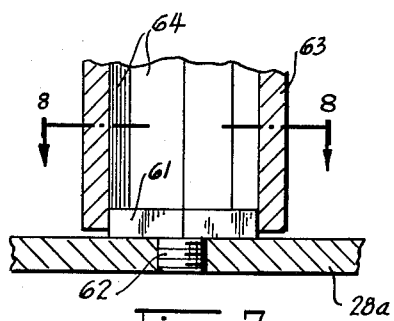
fig.7.
INVENTOR.
WILLIAM RESK
BY Frederick Breitenfeld
ATTORNEY Nov. 21, 1961  W. RESK  3,009,658
VEGETABLE-PEELING APPLIANCE FOR REMOVABLE APPLICATION TO A SINK
Filed March 10, 1958  3 Sheets-Sheet 3
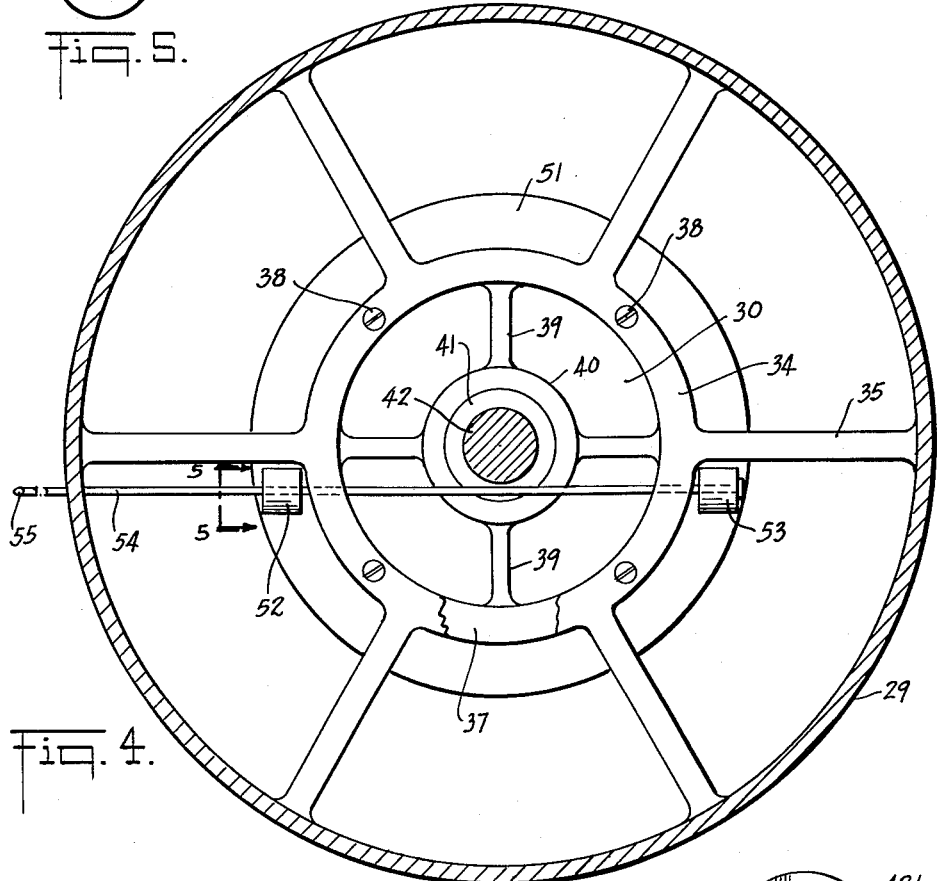
INVENTOR:
WILLIAM RESK
BY Frederick Breitenfeld
ATTORNEY

United States Patent Office

3,009,658
Patented Nov. 21, 1961

3,009,658
VEGETABLE-PEELING APPLIANCE FOR REMOVABLE APPLICATION TO A SINK
William Resk, Scarsdale, N.Y., assignor, by mesne assignments, to Peelquik Co., Inc., New Rochelle, N.Y., a corporation of New York
Filed Mar. 10, 1958, Ser. No. 720,343
10 Claims. (Cl. 241—101)

This invention relates generally to food machinery, and has particular reference to vegetable peelers.

It is a general object of the invention to provide a vegetable peeling appliance that may be removably fitted to a household sink in which there is a drain opening and a motor-driven element within the sink drain, the appliance being so constructed and designed that the power of said motor-driven element may be harnessed to the vegetable peeling apparatus. Such a motor-driven element, in the form of a plate or disk mounted for rotation on a vertical axis concentric with the sink drain opening, is commonly available in sink installations having garbage-disposal units associated therewith.

A more specific object of the invention is to achieve this result without in any way altering, adjusting, or otherwise affecting the mechanism or operation of any such disposal unit. Thus the new appliance may be sold or furnished for use with existing installations, or may be treated as an accessory to be made available to the purchaser or user of newly installed garbage disposal devices.

Another object of the invention is to provide a construction that is of such reasonably small dimensions that it will be useful in a practical manner as a household appliance. The device is so designed that it is easy to set up for use, relatively light in weight, simple to operate, easy to clean, and readily storable when not in use.

The vegetable peeling apparatus per se comprises an open-top vessel having an abrasive-lined cylindrical side wall and an abrasive-surfaced rotatable floor on which the vegetables rest. They become peeled as they are thrown about by centrifugal force and by impacts with the side wall. The operation proceeds during a continuous flow of water into the open top of the vessel, the debris flowing around the periphery of the rotating floor to a central opening in the bottom wall of the vessel, thence into and through the sink drain opening.

In accordance with the invention the vessel above referred to is provided with safe and practical and readily manipulable means for securing the vessel in proper position, and for transferring driving energy from the existing motor-driven element in the sink drain to the vegetable-supporting floor of the peeler. More particularly, a means in the form of a downwardly projecting hollow stem is provided on the vessel for entry into the drain opening of the sink, and a means is provided for removably securing this stem within the drain opening. The vegetable-supporting floor is mounted on the upper end of a shaft extending downwardly through said stem, and a means is provided at the lower end of the shaft for establishing a separable driving connection between the shaft and the motor-driven element.

Various alternatives are available in carrying out these general objectives. In a preferred embodiment of the invention, the engagement of the shaft with the motor-driven element is frictional in nature, and the manipulations required to be performed by the user are relatively simple, safe, and controllable from above the level of the sink floor.

Several ways of accomplishing these objects and achieving the benefits and advantages of the invention are illustrated in the accompanying drawings, in which FIG. 1 is an elevational view of an illustrative sink in connection with which the appliance may be used, a wall of the sink being broken away to reveal the appliance itself;

FIG. 2 is an enlarged elevational view, partly in section, of the appliance, a part of the shaft being broken away for the sake of compactness of illustration;

FIG. 3 is a view similar to FIG. 2 on a greatly enlarged scale, showing most of the elements in cross-section;

FIG. 4 is a cross-sectional view taken along the line 4—4 of FIG. 3;

FIG. 5 is a detail view taken along the line 5—5 of FIG. 4;

FIG. 6 is a fragmentary view illustrating a modification;

FIG. 7 is a fragmentary cross-sectional view, illustrating a further modification;

FIG. 8 is a cross-sectional view along the line 8—8 of FIG. 7;

FIG. 9 is a fragmentary cross-sectional view similar to FIG. 3, illustrating a further modification;

FIG. 10 is a cross-sectional view along the line 10—10 of FIG. 9; and

FIG. 11 is a fragmentary view along the direction 11—11 of FIG. 9.

The sink 20 chosen for illustration in FIG. 1 has been shown, for illustrative purposes, in association with a water faucet 21 of known character and arrangement. The sink is provided with a floor 22 in which there is a drain opening 23. Associated with the sink is a garbage disposal unit of known construction, including a housing 24 secured to and arranged beneath the sink drain opening 23, and an electric driving motor 25. Power for the motor is supplied through wires 26 in any appropriate manner, and means may be provided for turning the current on and off in any suitable known fashion. The outlet from the housing 24 is shown at 27.

The details of the mechanism within the disposal unit are not material to the present invention, except in so far as the mechanism includes a motor-driven element 28, in the form of a horizontal disk or floor rotated by the motor 25 on a vertical axis. It is this motor-driven element 28 from which the present improved vegetable peeling appliance derives its operating power.

The appliance comprises a vessel having a cylindrical side wall 29, and a bottom wall provided with a central opening 30. The vessel may advantageously be provided with a removable top wall 31 having its margin in-turned as shown in FIGS. 1 and 2, and provided with a central opening 32 through which water may be introduced in a flowing stream from the faucet 21 during the operation of the device.

The side wall 29 of the vessel is lined with an appropriate abrasive lining 33, for a purpose to be described in greater detail hereinafter.

Except for the central opening, the floor of the vessel may be an unbroken wall formed as an integral part of the side wall 29 or as a separate element. In the preferred construction herein illustrated, the bottom wall is of skeletonized nature. This not only facilitates the manufacturing procedure and imparts simplicity and lightness of weight, but it is more conducive to a free outflow of water when the rotating floor 43, presently to be described, is located relatively close to the bottom wall of the vessel. As illustrated, the bottom wall construction includes a ring-shaped part 34 surrounding the central region, and radiating arms 35 extending to the bottom edge of the side wall 29 and secured thereto by screws 36 or the like (see FIGURE 3).

The construction includes a hollow stem 37 concentric with the central opening in the floor of the vessel and projecting downwardly from the bottom wall of the vessel. In the construction illustrated, the stem 37 lies directly beneath the ring 34 and is secured thereto by screws or the like 38.

Radial arms 39 connect the outer part of the stem 37 to a concentric inner part 40 which serves as a shaft bearing and is provided with an appropriate anti-friction bushing 41. The axial length of the bearing 40 is somewhat less than that of the stem 37 as a whole.

Extending through the shaft bearing is the vertical shaft 42 which is secured at its upper end, in any suitable fashion, to a floor or disk 43 upon which the vegetables will rest. The diameter of this floor is slightly less than the internal diameter of the side wall 29 of the vessel, so that a free flow of liquid around the periphery of the floor 43 may take place. The upper face of the floor 43 is provided with an abrasive lining or surface 44.

At its lower end, the shaft 42 is provided with a means for establishing a separable driving connection between the shaft and the motor-driven element 28. In the construction shown in FIGS. 2 and 3, a rigid bushing 45 is mounted snugly in the upper end of a flexible sleeve 46 which projects downwardly from the bushing 45 for a considerable distance. The sleeve 46 is permanently secured to the bushing by means of screws 47 or the like, and it is composed of a tough wear-resistant material such as a fabric-reinforced rubber or rubber equivalent. The sleeve 46 should be sturdy enough to maintain a substantial alignment with the shaft 42, yet yieldable enough to establish a firm frictional engagement with the motor-driven element 28 when it is pressed downwardly against the latter.

An adjustable positioning of the bushing 45 along the shaft 42 is made possible by a set-screw 48 which may be loosened and tightened against the shaft.

The appliance includes also a means for removably securing the stem 37 within the drain opening 23 of the sink. A preferred way of accomplishing this is to provide an expansible band on the exterior of the stem 37, and to afford a means activatable from above the level of the drain opening for expanding the band into engagement with the drain opening. Thus, it will be observed that the stem is formed at its lower end with an outwardly directed flange 49. Extending around the stem 37, directly above this flange, is a band 50 of expansible or distortable resilient material such as rubber or its equivalent. Directly above the band 50 there is a ring or flange 51 which may be moved axially with respect to the stem 37. Cams 52 and 53, mounted upon a spindle 54, are adjustable to bear downwardly against the ring 51, thereby squeezing the band 50 between the parts 49 and 51 and causing it to expand as indicated in FIG. 3. This brings it into frictional immovable engagement with the wall of the drain opening and thus locks the appliance in position. This operation is best indicated by a comparison of FIGS. 2 and 3. It will be observed that the spindle 54 is provided at its end with a control handle 55. In FIG. 2 this handle is positioned upwardly and the cams 52 and 53 (eccentrically mounted on the spindle 54 as best indicated in FIG. 5) are out of contact with the ring 51. Under these circumstances there is no squeezing pressure upon the band 50. When the handle 55 is swung through 90 degrees into the position of FIG. 3, the cams 52 and 53 are caused to press downwardly upon the ring 51.

To prevent the shaft 42 from moving longitudinally upward while it is in operative engagement at its lower end with the element 28, a collar 56 may be mounted on the shaft, held in position thereon by a set-screw 57.

In using the appliance, it is first necessary to ascertain the lineal distance between the floor 22 of the sink and the motor-driven element 28. The bushing 45 is then adjusted on the shaft 42 so that the distance between the bottom end surface of the sleeve 46 and the bottom face of the ring 51 is about one-fourth inch more than the distance previously ascertained. The handle 55 is then manipulated to bring the parts into the unstressed condition, and the appliance is then inserted downwardly through the sink drain opening 23 until the bottom face of the ring 51 presses firmly against the sink bottom, as indicated in FIG. 3. This contact will be accompanied by a slight distortion of the lower end of the sleeve 46 as it is pressed downwardly against the element 28. The handle 55 is then manipulated to expand the band 50 into the engagement with the sink drain indicated in FIG. 3. The squeezing of the band 50 is brought about by a slight upward movement of the stem 37 (about one-eighth inch). This retains the sleeve 46 in firm frictional engagement with the element 28. The latter may now be brought into action by establishing electrical connection to the driving motor 25. This imparts corresponding rotation to the shaft 42 and the abrasive-surfaced vegetable-supporting floor 43. The desired peeling of the vegetables is achieved as a result of their abrasive contacts with the floor of the vessel and its cylindrical side wall, the debris being continuously washed away around the periphery of the rotating floor 43.

It is not essential that the element 28 be at rest when the appliance is set up for use. If desired, the element 28 may be in a rotating state when the sleeve 46 is brought into contact with it. However, under these circumstances care must be taken to apply the sleeve downwardly in as true a vertical direction as possible.

One of the advantages of the elongated flexible sleeve 46 lies in its ability to adjust itself to any slight irregularity that may exist in the vertical alignment of the motor-driven element 28 and the axis of the sink drain opening.

An alternative way of achieving a frictional engagement between the appliance shaft and the plate or element 28 is indicated in FIG. 6. A helical spring 58 is provided, of the kind which has a gradually increasing diameter from one end to the other. The narrow end is secured by any suitable means to the lower end of the shaft 42a. The larger end is thus enabled to establish a frictional engagement with the motor-driven element 28 when the appliance is brought into position to press the helical spring 58 downwardly against the element 28.

Another way of achieving the desired driving interconnection is indicated in FIGS. 7 and 8. In this case the lower end of the shaft is caused to embody a non-circular cross-sectional contour, whereby it may be positively engaged with a part of complementary shape provided at the center of the motor-driven element. An illustration of this, as indicated in FIG. 7 and 8, involves a square projection or nut 61 secured as at 62 to the center of the motor-driven element 28a, and a socket 63 formed at the end of the appliance shaft. The internal contour of the socket part 63 is complementary to the shape of the projection 61, and an advantageous inter-engagement can be achieved when the socket has the octagonal inner surface as indicated at 64.

When employing a positive drive connection as in FIGS. 7 and 8, the shaft should preferably be adjustable in length, in any appropriate manner, to bring the parts into conformity with the existing distance between the sink floor and the driving element with which the shaft establishes connection.

In FIGURE 4, the spindle 54 extends along a line closely adjacent to but tangent to the shaft 42. In FIGURES 9–11, a modified construction is shown in which the axis of the spindle intersects the shaft axis, whereby a further advantage can be achieved. The spindle 54a is in this case provided with a U-shaped offset 59 in the region of the shaft 42b, as best indicated in FIGURE 10. When the sprindle 54a is rotated on its axis through approximately 90 degrees, this offset can be caused to move between the full-line and dotted-line positions indicated in FIGURE 11. By providing an enlargement or shoulder 60 upon the shaft 42b, at an appropriate distance from the axis of the spindle 54a, the offset 59 can be caused to bear downwardly upon the shaft 42b whenever the spindle 54a is rotated to cause the cams to bear downwardly against the ring which compresses the expansible band. In this construction, therefore, there is no need to provide the shaft with a collar such as that indicated at 56 in FIGURES 2 and 3. Moreover, a single manipulation of the handle 55 will bring about, simultaneously, an engagement between the stem of the appliance and the sink drain opening, and a downward movement of the shaft to press its lower end into driving engagement with the element 28.

The absence of a collar 56 on the shaft makes it possible to bring the parts into a more compact relationship whenever the device is to be stored away between periods of use.

The device may have utility for purposes other than vegetable peeling. The rotating floor of the vessel affords a source of power from which other appliances may be driven. For example, if the floor 43 were to be provided at its center with a non-circular nut or other formation a separable driving connection might be established, when desired, with a flexible shaft or other transmission operatively associated with another appliance positioned within or adjacent to the present device. The presence of such a connecting medium at the center of the floor 43 would not interfere with or impair its action during the normal use of the device as a vegetable peeler.

In general, it will be understood that many of the details herein described and illustrated may be modified by those skilled in the art without necessarily departing from the spirit and scope of the invention as expressed in the appended claims.

What is claimed is:

1. A vegetable peeling appliance for removable application to a sink in which there is a drain opening and a garbage disposal unit having a motor-driven element within the sink drain rotating on a vertical axis concentric with said opening, comprising an open-top vessel having a cylindrical side wall and a bottom wall, said bottom wall comprising a ring-shaped part smaller than and concentric with said side wall and spaced radiating arms extending outwardly from said ring-shaped part to said side wall thereby forming openings in said bottom wall directly adjacent to said side wall, a hollow stem concentric with said ring-shaped part and projecting downwardly from said bottom wall, means for removably securing said stem within said drain opening, a central shaft bearing carried by said stem, a shaft extending through said bearing, an abrasive-surfaced vegetable-supporting floor in said vessel and secured to the upper end of said shaft, a resilient sleeve mounted at the lower end of said shaft, the lower end of said sleeve being adapted when said shaft is inserted into the sink drain to bear down frictionally against said motor-driven element in order to transmit the rotary motion of said element to said shaft, and the lower end of said sleeve being capable due to its resilient nature of conforming in shape to the contour of the motor-driven element of any conventional garbage disposal unit which may be located within the sink drain thereby obviating the necessity of altering said motor-driven element in any way, and means for preventing upward axial movement of said shaft in said bearing.

2. A vegetable peeling appliance as defined in claim 1, including a rigid bushing secured in the upper end of said resilient sleeve and slidably mounted on the lower shaft end, and means for locking said bushing in selected axial positions on said shaft, whereby the total length of said shaft and said sleeve may be adjusted to be slightly longer than the distance between said drain opening and said motor-driven element.

3. A vegetable peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, means at the lower end of said shaft for establishing a separable frictional driving connection between said shaft and said motor-driven element, and means for preventing upward axial movement of said shaft in said bearing, said last-mentioned means comprising an enlargement on the shaft, camming means carried by said stem for pressing downwardly against said enlargement, and a handle accessible above the level of the drain opening for actuating said camming means.

4. A vegetable peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, and means at the lower end of said shaft for establishing a separable frictional driving connection between said shaft and said motor-driven element; said stem-securing means comprising an expansible band mounted on the exterior of said stem, and means activatable from above the level of said drain opening for expanding said band into engagement with the drain opening.

5. A vegetable-peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, and means at the lower end of said shaft for establishing a separable frictional driving connection between said shaft and said motor-driven element; said stem-securing means comprising a distortable flexible band mounted on the exterior of said stem, flanges on the stem directly above and below said band, at least one of said flanges being axially movable, and means activatable from above the level of said drain opening for forcing said flanges toward each other so as to squeeze said band and thereby distort it to enlarge its diameter against the inner wall of said drain opening.

6. A vegetable-peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, and means at the lower end of said shaft for establishing a separable frictional driving connection between said shaft and said motor-driven element; said stem-securing means comprising a distortable flexible band mounted on the exterior of said stem, a fixed flange on the stem directly below said band, an axially movable ring on said stem directly above said band, a cam carried by said stem and adapted to bear down upon said ring to thereby squeeze said band and enlarge its diameter against the inner wall of said drain opening, and a handle accessible above the level of the drain opening for actuating said cam.

7. A vegetable-peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, means at the lower end of said shaft for establishing a separable frictional driving connection between said shaft and said motor-driven element, and means for preventing upward axial movement of said shaft in said bearing; said stem-securing means comprising an expansible band on the exterior of said stem and adapted when expanded to engage with the wall of the drain opening, said means for preventing axial movement of the shaft comprising a shoulder on the shaft and a cam adapted to bear downwardly against said shoulder, and a common control means activatable from above the level of the drain opening for expanding said band and also moving said cam.

8. A vegetable-peeling appliance for removable application to a sink in which there is a drain opening and a motor-driven element within the sink drain rotating on a vertical axis concentric with said opening, comprising an open-top vessel having a cylindrical side wall and a bottom wall formed with a central opening, a hollow stem concentric with said central opening and projecting downwardly from said bottom wall, means for removably securing said stem within said drain opening, a central shaft bearing carried by said stem, a shaft extending through said bearing, an abrasive surfaced vegetable-supporting floor in said vessel and secured to the upper end of said shaft, means at the lower end of said shaft for establishing a separable frictional driving connection between said shaft and said motor-driven element, and means for preventing upward axial movement of said shaft in said bearing; said stem-securing means comprising an expansible band on the exterior of said stem and adapted when expanded to engage with the wall of the drain opening, said means for preventing axial movement of the shaft comprising a shoulder on the shaft, and camming means activatable from above the level of the drain opening for expanding said band and also pressing downwardly against said shoulder.

9. A vegetable peeling appliance as defined in claim 1 wherein the length of said resilient sleeve exceeds its diameter so that it is flexible with respect to its longitudinal axis.

10. A vegetable peeling appliance for removable application to a sink in which there is a drain opening and a garbage disposal unit having a motor-driven element within the sink drain rotating on a vertical axis concentric with said opening, comprising an open-top vessel having a cylindrical side wall and a bottom wall formed with a central opening, a hollow stem concentric with said central opening part and projecting downwardly from said bottom wall, means for removably securing said stem within said drain opening, a central shaft bearing carried by said stem, a shaft extending through said bearing, an abrasive-surfaced vegetable-supporting floor in said vessel and secured to the upper end of said shaft, a resilient sleeve mounted at the lower end of said shaft, the lower end of said sleeve being adapted when said shaft is inserted into the sink drain to bear down frictionally against said motor-driven element in order to transmit the rotary motion of said element to said shaft, and the lower end of said sleeve being capable due to its resilient nature of conforming in shape to the contour of the motor-driven element of any conventional garbage disposal unit which may be located within the sink drain thereby obviating the necessity of altering said motor-driven element in any way, and means for preventing upward axial movement of said shaft in said bearing.

References Cited in the file of this patent

UNITED STATES PATENTS

| | | |
|---|---|---|
| 2,174,010 | Patterson | Sept. 26, 1939 |
| 2,499,291 | Baumann | Feb. 28, 1950 |
| 2,675,968 | Dunbar | Apr. 20, 1954 |
| 2,781,175 | Metzger | Feb. 12, 1957 |
| 2,824,434 | Stern | Feb. 25, 1958 |
| 2,869,794 | Modrey | Jan. 20, 1959 |